(12) United States Patent
Luo et al.

(10) Patent No.: US 11,418,382 B2
(45) Date of Patent: Aug. 16, 2022

(54) METHOD OF COOPERATIVE ACTIVE-STANDBY FAILOVER BETWEEN LOGICAL ROUTERS BASED ON HEALTH OF ATTACHED SERVICES

(71) Applicant: VMware, Inc., Palo Alto, CA (US)

(72) Inventors: Haihua Luo, San Jose, CA (US); Jerry Cheng, Fremont, CA (US); Kai-Wei Fan, San Jose, CA (US); Michael Hu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/037,992

(22) Filed: Jul. 17, 2018

(65) Prior Publication Data

US 2020/0028731 A1  Jan. 23, 2020

(51) Int. Cl.
| | | |
|---|---|---|
| *G01R 31/08* | (2020.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |

(Continued)

(52) U.S. Cl.
CPC ...... *H04L 41/0668* (2013.01); *H04L 41/0672* (2013.01); *H04L 43/0817* (2013.01); *H04L 45/30* (2013.01)

(58) Field of Classification Search
CPC ............. H04L 41/0668; H04L 41/0672; H04L 43/0817; H04L 45/30; G06F 9/45558; G06F 9/5077; H04M 15/56; H04M 15/8044; H04M 15/8055; H04W 76/12; H04W 12/0017; H04W 12/06; H04W 12/08

See application file for complete search history.

(56) References Cited

U.S. PATENT DOCUMENTS 5,835,696 A * 11/1998 Hess ................... G06F 11/2005
714/10
6,108,300 A * 8/2000 Coile ..................... H04L 69/40
714/4.12

(Continued)

OTHER PUBLICATIONS

Fan, U.S. Appl. No. 16/048,107, filed Jul. 27, 2018, Notice of Allowance, dated Aug. 26, 2019.

(Continued)

*Primary Examiner* — Stephen M D Agosta

(57) ABSTRACT

A method for cooperative active-standby failover between service routers based on health of services configured on the service routers is presented. In an embodiment, a method comprises determining, by a first service router ("SR") of a SR cluster, a plurality of aggregate score values for a plurality of SRs of the SR clusters. The SR cluster comprises the first SR which is active, and a second SR. An aggregate score value, of the plurality of aggregate score values, indicates health of one or more services configured on a SR. The method further comprises determining, based on the plurality of aggregate score values, whether the first SR, of the SR cluster, is healthier than the second SR. In response to determining that the first SR is healthier than the second SR, the first SR continues to operate in the active mode; otherwise, the first SR switches to a standby mode.

20 Claims, 6 Drawing Sheets

(51) Int. Cl.
*H04L 12/26* (2006.01)
*H04L 41/0668* (2022.01)
*H04L 43/0817* (2022.01)
*H04L 41/0654* (2022.01)
*H04L 45/30* (2022.01)

(56) References Cited

U.S. PATENT DOCUMENTS

| | | | | |
|---|---|---|---|---|
| 6,286,048 | B1* | 9/2001 | Moberg | H04L 45/00 709/225 |
| 6,754,220 | B1* | 6/2004 | Lamberton | H04L 12/2856 714/4.11 |
| 6,954,436 | B1* | 10/2005 | Yip | H04L 45/02 370/217 |
| 7,152,179 | B1* | 12/2006 | Critchfield | H04L 12/56 714/4.11 |
| 7,194,653 | B1* | 3/2007 | Hadders | H04L 43/10 370/219 |
| 7,415,507 | B1* | 8/2008 | Ward | H04L 49/70 709/217 |
| 7,486,611 | B1* | 2/2009 | Wilson | H04L 1/22 370/219 |
| 7,554,903 | B2* | 6/2009 | Blankenship | H04L 45/00 370/219 |
| 8,001,269 | B1* | 8/2011 | Satapati | H04L 29/12028 709/245 |
| 9,838,317 | B1* | 12/2017 | Yadav | H04L 43/0829 |
| 10,250,562 | B1 | 4/2019 | Srinath | |
| 10,374,924 | B1* | 8/2019 | Holland | H04L 43/0817 |
| 2002/0078232 | A1* | 6/2002 | Simpson | H04L 45/04 709/239 |
| 2005/0058063 | A1* | 3/2005 | Masuyama | H04L 41/0663 370/217 |
| 2005/0240797 | A1* | 10/2005 | Orava | H04L 45/28 714/4.11 |
| 2006/0036762 | A1* | 2/2006 | Vadlakonda | H04L 45/02 709/238 |
| 2006/0047809 | A1* | 3/2006 | Slattery | H04L 43/02 709/224 |
| 2006/0064486 | A1* | 3/2006 | Baron | H04L 41/0886 709/224 |
| 2006/0087976 | A1* | 4/2006 | Rhodes | H04L 43/0817 370/242 |
| 2007/0127461 | A1* | 6/2007 | Yamada | H04L 29/12028 370/389 |
| 2007/0264971 | A1* | 11/2007 | Blankenship | H04L 45/586 455/406 |
| 2008/0016206 | A1* | 1/2008 | Ma | H04L 43/0817 709/224 |
| 2008/0205402 | A1* | 8/2008 | McGee | H04L 61/6022 370/392 |
| 2008/0212483 | A1 | 9/2008 | Zhang | |
| 2009/0132862 | A1* | 5/2009 | Martin | H04L 41/0659 714/45 |
| 2009/0285090 | A1 | 11/2009 | Allasia | |
| 2010/0023632 | A1 | 1/2010 | Liu | |
| 2010/0293293 | A1* | 11/2010 | Beser | H04L 45/00 709/238 |
| 2011/0267962 | A1* | 11/2011 | J S A | H04L 41/147 370/242 |
| 2012/0155283 | A1 | 6/2012 | Sanguineti | |
| 2012/0194634 | A1* | 8/2012 | Ferdinand | H04L 65/1069 348/14.08 |
| 2012/0317437 | A1* | 12/2012 | Kanso | G06F 11/2035 714/3 |
| 2013/0322232 | A1 | 12/2013 | Csaszar | |
| 2013/0343174 | A1* | 12/2013 | Guichard | H04L 41/5025 370/218 |
| 2014/0016457 | A1 | 1/2014 | Enyedi | |
| 2014/0078887 | A1 | 3/2014 | Yu | |
| 2014/0095696 | A1* | 4/2014 | Sala | G06F 11/3409 709/224 |
| 2014/0112122 | A1* | 4/2014 | Kapadia | H04L 45/74 370/219 |
| 2014/0143591 | A1* | 5/2014 | Chiang | G06F 11/2002 714/4.11 |
| 2015/0023352 | A1* | 1/2015 | Yang | H04L 45/74 370/392 |
| 2015/0055650 | A1* | 2/2015 | Bhat | H04L 12/185 370/390 |
| 2015/0076903 | A1* | 3/2015 | Kanayama | H02J 3/40 307/24 |
| 2016/0065498 | A1* | 3/2016 | Harper | H04L 47/826 709/223 |
| 2016/0149980 | A1* | 5/2016 | Karthikeyan | H04L 65/4076 709/219 |
| 2016/0191613 | A1 | 6/2016 | Srinivasan | |
| 2016/0226700 | A1* | 8/2016 | Zhang | H04L 49/25 |
| 2016/0248806 | A1* | 8/2016 | Smith | H04L 63/1458 |
| 2017/0111157 | A1* | 4/2017 | Nagrath | H04L 5/0096 |
| 2017/0171056 | A1* | 6/2017 | Dong | H04L 45/64 |
| 2018/0063731 | A1 | 3/2018 | Ashrafi | |
| 2018/0123956 | A1* | 5/2018 | Theogaraj | H04L 45/586 |
| 2020/0036576 | A1 | 1/2020 | Fan | |
| 2021/0058284 | A1* | 2/2021 | Chandramohan | H04L 41/0668 |

OTHER PUBLICATIONS

Egress Software Technologies Ltd, Technical White Paper entitled "TLS encryption: Is is really the answer to securing email?" (8 pages).

* cited by examiner

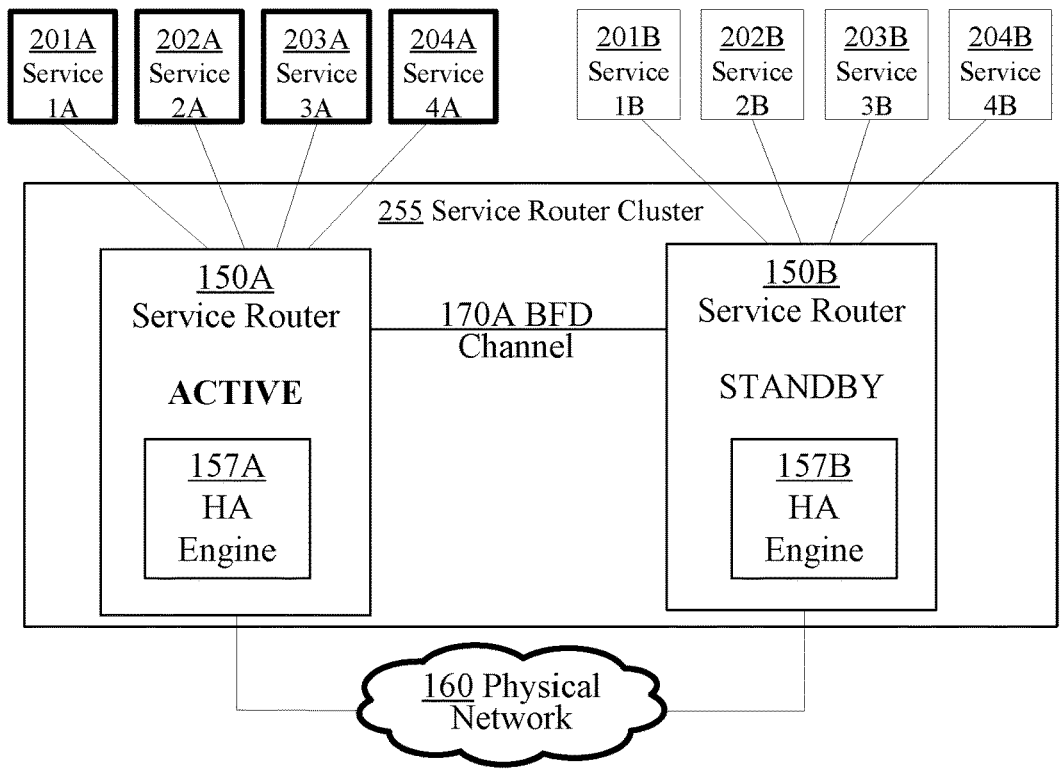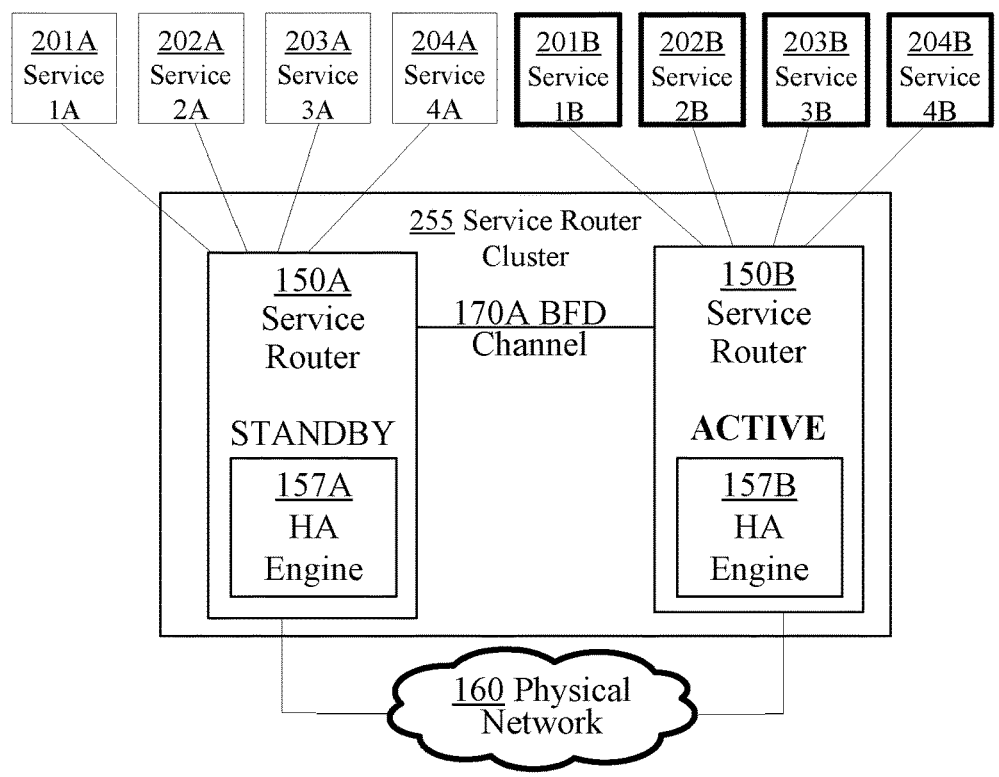

METHOD OF COOPERATIVE ACTIVE-STANDBY FAILOVER BETWEEN LOGICAL ROUTERS BASED ON HEALTH OF ATTACHED SERVICES

BACKGROUND

A high availability system is a system that is resilient to failures of the system's components. Typically, this is achieved by providing redundant components so that if one component fails, a redundant component can take over the tasks of the component that failed. In software defined networking ("SDN"), high availability ("HA") may be implemented in service routers ("SRs") that are configured in an active-standby mode.

A SR may be implemented as a logical router that is configured and deployed, for example, on an edge services gateway ("ESG"). A logical router is a router that routes data packets between logical overlay networks or subnets. Each logical overlay network is logically decoupled from a physical underlay network such as a physical network infrastructure.

An ESG can route data packets in and out of a logical overlay network and outside networks. The ESG may be implemented as a collection of software components that can provide different edge services, including data packet routing, firewall services, NAT, DHCP, VPN, load balancing, and the like. ESGs may be installed on virtual machines ("VMs") in a datacenter. As such, the ESG may be referred to as a virtual appliance, a virtual network function, or a service VM.

In a typical HA scenario, a pair of SRs forms a SR cluster, and each of the SRs in the cluster is realized on a different ESG node. One of the SRs in the cluster operates in an active mode, while another SR operates in a standby mode. The active SR may be configured to forward data traffic and apply the services that are configured on the active SR's ESG. The standby SR may remain in the standby mode until it needs to become active.

Switching a SR from operating in an active mode to operating in a standby mode is usually triggered upon receiving an indication that the active SR has failed or that an edge gateway node on which the active SR executes has failed. That may happen upon detecting that, for example, an interface line status has changed, a data path process has failed, a bidirectional forwarding detection ("BFD") link has failed, or a border gateway protocol ("BGP") routing status has changed. None of those, however, takes into consideration health status of the services configured on the SRs. Furthermore, none of those takes into consideration the relative health of the SRs in the cluster.

SUMMARY

Techniques are presented herein for providing HA support by a SR cluster to perform services switchover without affecting other clusters configured on the same ESG. The SR cluster includes a pair of SRs, one of which operates in an active mode and another in a standby mode. The SR cluster may be implemented on an edge gateway. The services switchover may occur when at least one service configured on the active SR of the SR cluster fails.

In addition, techniques are described herein for performing a cooperative active-standby failover between logical SRs based on health of services configured on the SRs in an active-standby SR cluster. The techniques include determining the health status of the services configured on the SRs in the cluster, exchanging the health information between the SRs, and determining, based, at least in part, on the relative health of the two SRs, whether to switch all services configured on an active SR to a standby SR.

A service switchover described herein is a high-level granularity failover process. That means that the switchover pertains to switching either all services from one SR onto another SR, or switching no services from one SR onto another SR. For example, if it is determined that some services configured on an active SR have failed, and that a standby SR has become healthier than the active SR, then all, not just some, services configured on the active SR may be switched over to the standby SR, and the standby SR may become active.

BRIEF DESCRIPTION OF THE DRAWINGS

In the drawings:

FIG. 2A is a block diagram depicting an example cooperative active-standby cluster prior to switching services from an active service router to a standby service router.

FIG. 2B is a block diagram depicting an example cooperative active-standby cluster after switching services from an active service router to a standby service router.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
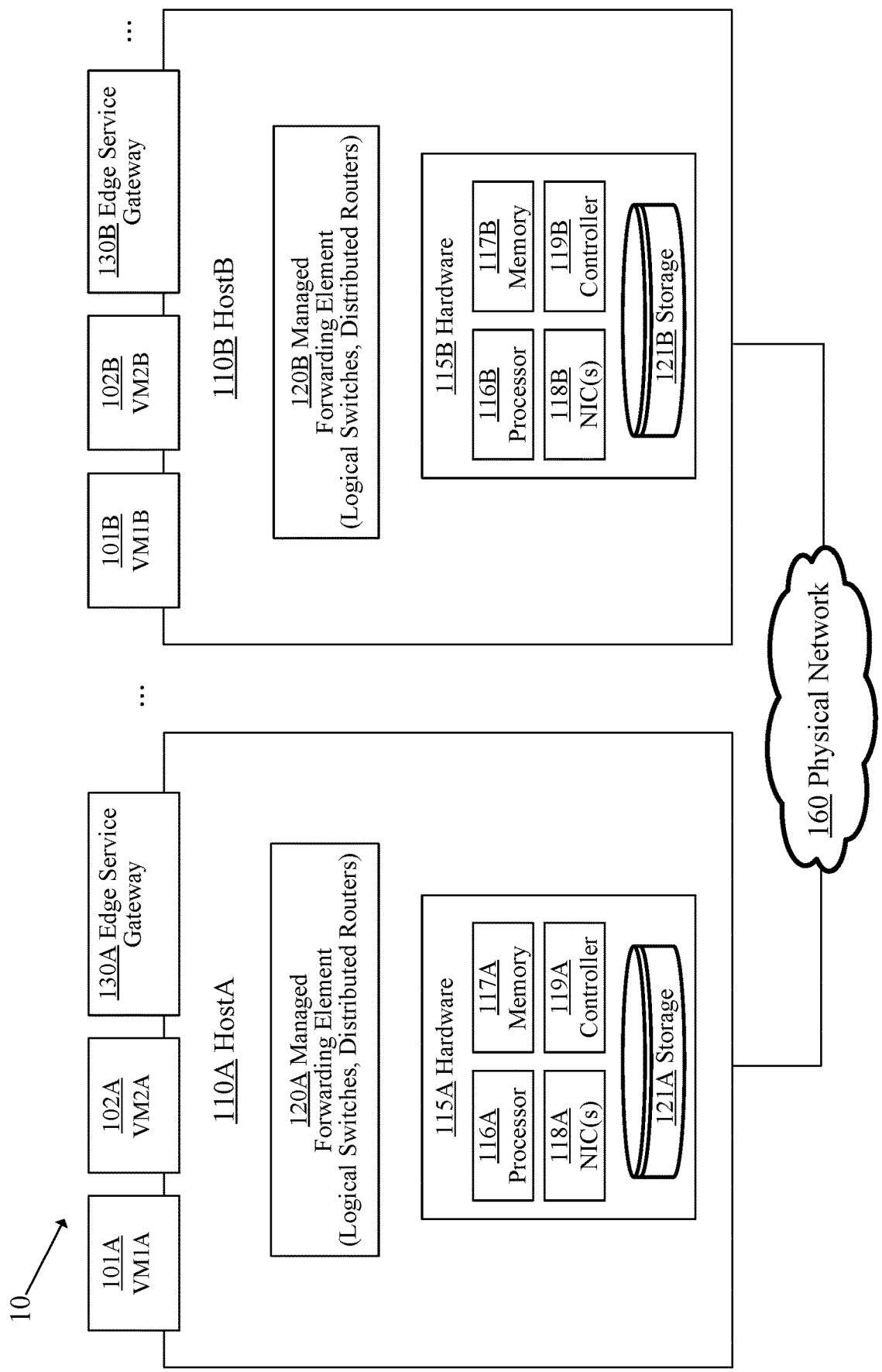
FIG. 1 is a block diagram depicting an example physical implementation view of an example logical network environment for implementing a cooperative active-standby failover between logical routers based on health of attached services.

FIG. 1 is a block diagram depicting an example physical implementation view of an example logical network environment for implementing a cooperative active-standby failover between logical routers based on health of attached services. In the depicted example, environment 10 includes one or more hosts 110A and 110B, and one or more physical networks 160. Environment 10 may include additional hosts and additional nodes not depicted in FIG. 1.

Hosts 110A and 110B may be configured to implement VMs, ESGs, logical routers, logical switches, and the like. Hosts 110A and 110B are also referred to as computing devices, host computers, host devices, physical servers, server systems, or physical machines.

In the example depicted in FIG. 1, host 110A is configured to support a VM1A 101A, a VM2A 102A, and an ESG 130A; while host 110B is configured to support a VM1B 101B, a VM2B 102B, and an ESG 130B. The hosts may support additional VMs and additional gateways not depicted in FIG. 1.

Virtual machines VM1A-VM2B executed on hosts 110A-110B, respectively, are examples of virtualized computing instances or workloads. A virtualized computing instance may represent an addressable data compute node or an isolated user space instance.

An ESG is a virtualized network component that may be configured to provide edge security and gateway services to VMs and hosts. It may be implemented as a logical router or as a service gateway, and may provide dynamic routing services, firewall services, NAT services, DHCP services, site-to-site VPN services, L2 VPN services, load balancing services, and the like.

An ESG can be either a VM or a physical machine. If an ESG is implemented in a VM, then the gateway runs on a hypervisor. If an ESG is implemented in a physical machine, then the gateway executes on a physical server.

In the depicted example, ESGs 130A and 130B may implement for example, gateways configured to process and forward data traffic to, and from, VMs and hosts.

In an embodiment, ESGs 130A and 130B implement one or more SRs (depicted in FIG. 2, but not in FIG. 1) that are configured to provide various services to for example, VM1A-VM2B. Examples of SRs are described in FIG. 2.

In an embodiment, hosts 110A and 110B are configured to support execution of hypervisors (not depicted in FIG. 1) and execution of managed forwarding elements 120A and 120B (which may be implemented as components of hypervisors), respectively.

Managed forwarding elements 120A and 120B may be software components configured to perform forwarding of data packets that are received from, or sent to, VMs and/or ESGs. For example, if managing forwarding element 120A executing on host 110A receives a data packet from VM1A 101A, then managing forwarding element 120A may perform the processing of a logical switch, which is logically coupled to VM1A 101A, to direct the packet to for example, ESG 130A.

Each of hosts 110A and 110B includes one or more hardware components. Hardware components 115A/115B may include one or more processors 116A/116B, one or more memory units 117A/117B, one or more network interface controllers 118A/118B, one or more physical network controllers 119A/119B, and/or one or more storage devices 121A/121B. Hardware components 115A/115B may include additional elements not depicted in FIG. 1.

2. Preemptive and Non-Preemptive Modes

A cooperative active-standby failover between logical SRs may be implemented in either a non-preemptive mode or a preemptive mode. The difference between the preemptive mode and the non-preemptive mode is mainly in the failback behavior. In a preemptive mode, the system will "failback" as soon as the service is restored on the original active node, whereas in a non-preemptive system, the standby node that became active may remain active until it fails.

SRs configured in an active/standby cluster may have assigned ranks. When a SR recovers and has the higher rank than a peer SR, then in a preemptive mode the recovered SR becomes active; whereas in a non-preemptive mode the recovered SR checks the peer's status to decide whether the SR should go active.

In a preemptive mode, there is also a possibility that a higher-ranked, recovered SR remains in a standby mode as it notifies a peer that it has recovered and as it waits for the peer to relinquish its own active role. Once the peer relinquishes the active role, the recovered SR goes active.

In a non-preemptive mode, all services, regardless of their types, configured in an active-standby SR cluster participate in the service-triggered switchover. In the non-preemptive mode, a SR that is the healthiest in the cluster remains or becomes active.

3. Example Cooperative Active-Standby Failover Between Two Service Routers

FIG. 2A is a block diagram depicting an example cooperative active-standby cluster prior to switching services from an active SR to a standby SR. In the depicted example, an approach for the cooperative active-standby failover is implemented in a SR cluster 255 that includes SRs 150A-150B.

In an embodiment, all services configured on SRs of an active-standby cluster report their health status to HA engines, also referred to as HA logic. The HA logic may be implemented inside the SRs. Each SR may implement its own HA engine, and the HA engines implemented in the SRs may communicate with each other.

In FIG. 2A, SR 150A is operating in an active mode, while SR 150B is operating in a standby mode. SR 150A is configured with a plurality of services, including services 201A-204A; and all services 201A-204A are active. SR 150B is configured with a plurality of services, including services 201B-204B; and all services 201B-204B are standby. For clarity of the description, the active services in FIG. 2A are depicted using squares that have thicker edges than the edges of the standby services.

SRs 150A-150B may communicate with each other via a bidirectional forwarding detection ("BFD") channel 170A. SRs 150A-150B may use BFD channel 170A to exchange various messages and information. Communications exchanged along BFD channel 170A may be transmitted in compliance with a common protocol that provides mechanisms for exchanging messages and scores between the SRs.

Services configured on SRs may report their own health status in many ways. For example, an operational service may generate a message that includes a statement "ready" and transmit that message to HA engines implemented on the SRs, while a nonoperational service—if it can—may generate a message "not_ready," and transmit that message to the HA engines. The SRs may also implement daemons that monitor non-operational services, as some of the non-operational services may be unable to generate and/or send "not_ready" messages. In that situation, the daemons step in and report the "not_ready" messages to the HA engines.

Based on "ready" messages and "not_ready" messages received from services configured on SRs, the HA engines may compute aggregate scores for the SRs. An aggregate score computed for a SR may be a sum of the "ready" messages received from the services configured on the SR. The HA engines may communicate the aggregate scores to all SRs in a cluster to allow the SRs to work in concert to determine whether a switchover should occur. The aggregate scores may be communicated to SRs using a common protocol that provides mechanisms for sending messages and scores to the SRs.

An aggregate score computed for a SR represents a health measure of the SR. Each SR cluster may have its own criteria for determining health measures of SRs. In an embodiment, the higher the aggregate score of a SR is, the healthier the SR is. If for example, a "ready" message from a SR's healthy service is awarded a score of one, and a "not_ready" message from an unhealthy service is given a score of zero, then an aggregate score computed for the SR represents a count of the healthy services configured on the SR. Thus, if a SR has four services, out of which three services are healthy and one is unhealthy, then an aggregate score computed for the SR is three.

Based on aggregate scores, each SR of the two SRs in a cluster determines the SR that has the highest aggregate score, and thus is the healthiest SR in the cluster. In a non-preemptive mode, the SR with the highest relative health usually becomes or remains an active SR.

A SR may determine its own relative health by comparing its own aggregate score with an aggregate score of a peer SR in a cluster. When an active SR determines that its own aggregate score exceeds an aggregate score computed for a standby SR, then the active SR may determine that it is healthier than the standby SR, and thus it may remain active. However, if an active SR determines that its own aggregate score is lower than the score computed for a standby SR, then the active SR may determine that the standby SR is healthier, and thus a failover should be triggered. Some exceptions to this rule are described later.

Suppose that both SRs operate in a non-preemptive mode, and that SR 150A is active, SR 150B is standby, and an aggregate score computed for SR 150A exceeds an aggregate score computed for SR 150B. In this situation, active SR 150A may determine that SR 150A is healthier than SR 150B, and therefore, SR 150A may remain active.

However, if an aggregate score computed for SR 150A is lower than an aggregate score computed for SR 150B, then SR 150A may determine that SR 150B is healthier than 150A, and therefore a switchover of services 201A-204A from SR 150A to SR 150B should be triggered. Once the switchover is triggered, SR 150B starts providing services 201B-204B, as depicted in FIG. 2B. Furthermore, SR 150B changes its own state from standby to active, while SR 150A becomes standby. The process of changing a state from active to standby is described in FIG. 6.

FIG. 2B is a block diagram depicting an example cooperative active-standby cluster after switching services from an active service router to a standby service router. In the depicted example, an approach for cooperative active-standby failover is implemented in SR cluster 255 that includes SRs 150A-150B. In FIG. 2B, SR 150A transitioned from an active state to a standby state using for example, a process described in FIG. 6, and SR 150B transitioned from a standby state to an active state.

In FIG. 2B, SR 150A is configured with a plurality of services, including services 201A-204A; and all services 201A-204A are standby. SR 150B is configured with a plurality of services, including services 201B-204B; and all services 201B-204B are active. For clarity of the description, the active services are depicted using squares that have thicker edges than the edges of the squares representing the standby services.

Figure 3:
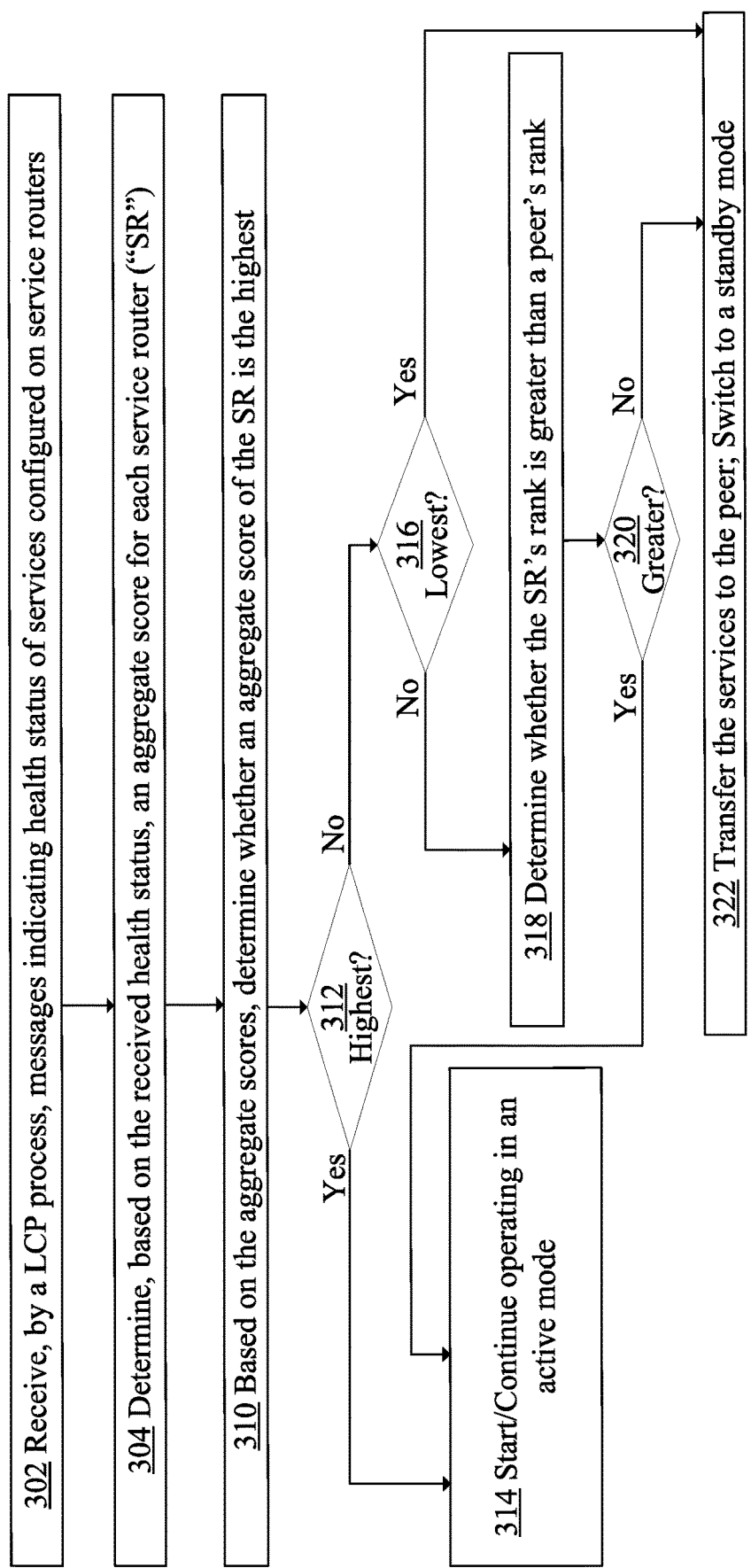
FIG. 3 is a flow chart for implementing a cooperative active-standby failover between two non-preemptive service routers based on health of attached services.

4. Example Cooperative Active-Standby Failover Between Two Non-Preemptive Service Routers FIG. 3 is a flow chart for implementing a cooperative active-standby failover between two non-preemptive service routers based on health of attached services. In the approach described in FIG. 3, it is assumed that none of the services is mandatory.

In one possible implementation, the steps depicted in FIG. 3 are performed by local control plane ("LCP") processes (not shown) which each may be a program or software component that executes locally on the host and implements control functionality, such as configuring and managing the router functions, possibly on behalf of a central controller running in a separate server system or cluster (not shown). Each of the two SRs may implement its own LCP processes. The LCP processes may be configured to manage messages received from the services configured on the SRs, and handle health scores and states of the SRs.

In step 302, an LCP process implemented on an SR receives messages indicating health status of services configured on the SRs. The LCP process may receive the messages via a channel that is separate from a BFD channel. The health status of a service may indicate whether the service is operational or not. A message from an operational service may include a statement "ready," while a message from a nonoperational service may include a statement "not_ready." If, for example, four services are configured on each of the SRs, then the LCP process implemented on a SR1 may receive four messages from the four services configured on the SR1 and four messages from the four services configured on a SR2.

In step 304, the LCP process determines, based on the received health status messages, an aggregate score for each SR in the SR cluster. An aggregate score computed for a SR represents a health measure of the SR. A healthy service may be awarded a score of one, while an unhealthy service may be given a score of zero. If all four services configured on a SR sent "ready" messages, then an aggregate score for the SR is four. However, if three services configured on a SR sent "ready" messages, but one service sent a "not_ready" message, then an aggregate score for the SR is three.

Although not depicted in FIG. 3, in situations when the services are grouped into tiers, the LCP process may also indicate whether the service is mandatory. For example, if a service, configured on a SR1, is mandatory, then a 1/0 bit is sent. If none of the mandatory services is ready, then the total score is zero.

In step 310, based on the aggregate scores, the LCP process of the first SR determines whether its own aggregate score is higher than an aggregate score of a peer SR.

If, in step 312, the LCP process of the first SR determines that its own score is the highest score, then the first SR proceeds to performing step 314; otherwise, the first SR proceeds to performing step 316.

In step 314, the first SR determines that it is healthier than the second SR, and therefore, the first SR continues operating in an active mode.

In step 316, the first SR determines whether its own aggregate score is the lowest score, i.e., whether its own aggregate score is lower than an aggregate score of the second SR. If there are more than two SRs in the cluster, then the first SR determines whether its own aggregate score is lower than the next-highest aggregate score. If it is not, i.e., they have the same score, then the first SR proceeds to performing step 318; otherwise, the first SR proceeds to performing step 322.

In step 318, which the first SR reaches if the first SR determines that both SRs are equally healthy, the first SR determines whether its own rank is greater than a rank of the second SR. Ranks may be assigned to the SR by users, and/or may be communicated to the SRs by HA engines.

In the preemptive behavior, if the first SR determines that its own rank is greater than the rank of the second SR, then the first SR proceeds to performing step 314; otherwise, the first SR proceeds to performing step 322.

In step 322, the first SR transfers the services from the first SR to the second SR, transitions from an active state to a standby state, and causes the second SR to transition from a standby state to an active state.

Although not depicted in FIG. 3, once services configured on the first SR recover and become operational, the services configured on the first SR and the services configured on the second SR will transmit their health status messages to HA engines, and the HA engines will compute new aggregate scores for the SRs. If the aggregate score for the first SR becomes higher than the aggregate score for the second SR, then the first SR may reclaim their own services from the second SR.

5. Example Cooperative Active-Standby Failover Between Two-Tier Service Routers

Figure 4:
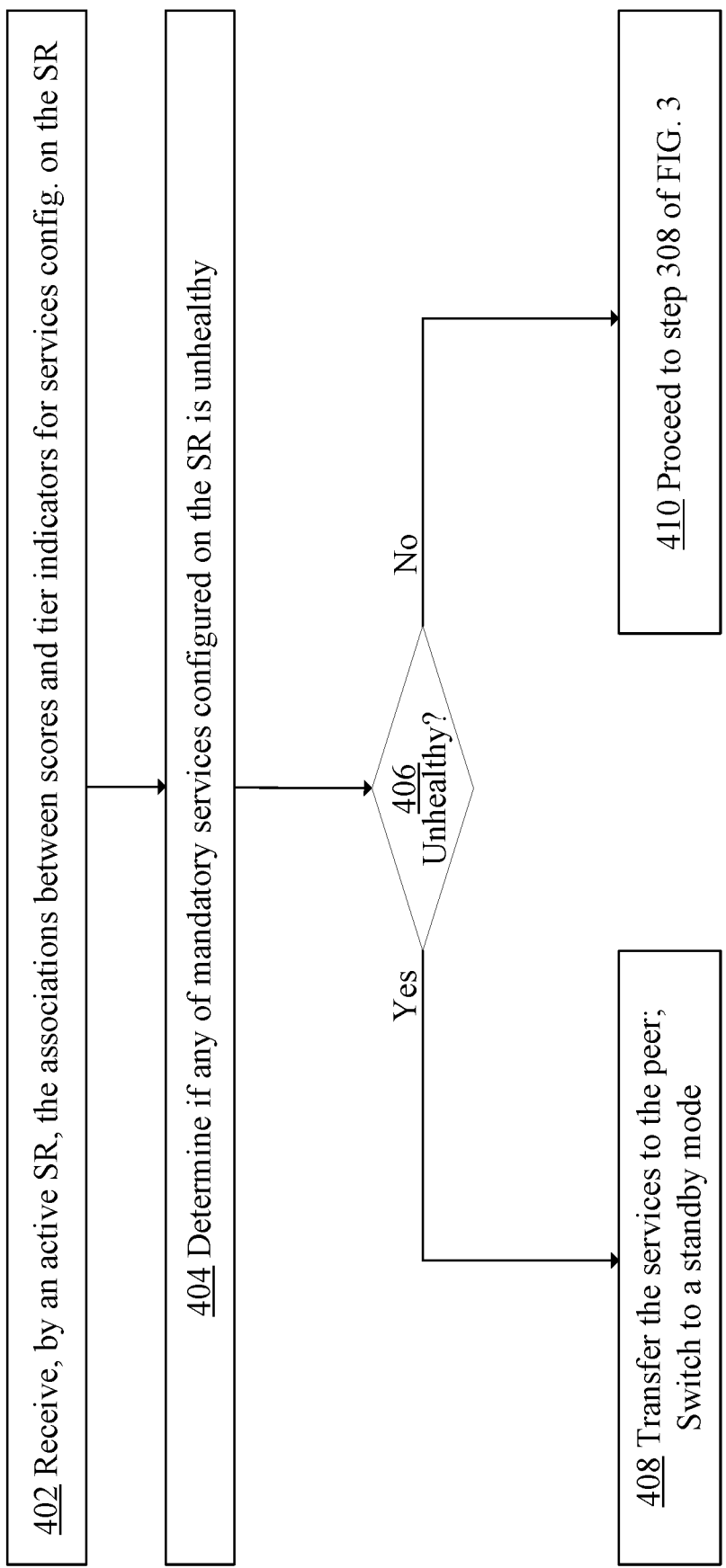
FIG. 4 is a flow chart for implementing a cooperative active-standby failover between two-tier service routers based on health of attached services.

FIG. 4 is a flow chart for implementing a cooperative active-standby failover between two-tier service routers based on health of attached services. Steps 402-410 are performed by a SR, or a LCP process implemented in the SR. The SR operates in a SR cluster that has been configured with one or more mandatory services. A mandatory service is a service that needs to be operational for a user as long as the user requires the service.

A SR cluster that has been configured with mandatory services supports HA in both a preemptive mode and non-preemptive mode. In a preemptive mode, for the purpose of providing HA, services configured on the SRs are grouped into two tiers. A critical tier may include mandatory services, while an optional tier may include nonmandatory services. Determination which services are mandatory and which services are nonmandatory may be made by users.

In step 402, an active SR, or an LCP implemented on an active SR, receives, from the services configured on the active SR, one or more associations between scores of services configured on the active SR and tier indicators of the services configured on the active SR. An example of an association for an operational, mandatory service, configured on a SR1, and included in a critical_tier, may be [1, critical_tier], or [1, critical_tier, SR1]. An example of an association for a nonoperational, mandatory service, configured on a SR1, and included in a critical_tier, may be [0, critical_tier], or [0, critical_tier, SR1]. An example of an association for a nonoperational, nonmandatory service, configured on a SR1, and included in an optional_tier, may be [0, optional_tier], or [0, optional_tier, SR1].

In step 404, the active SR determines, based on the received associations, whether any of critical_tier services configured on the active SR is nonoperational.

If, in step 406, the active SR determined that one or more mandatory services, configured on the active SR, became nonoperational, then the active SR proceeds to performing step 408; otherwise, the active SR proceeds to performing step 410.

In step 408, which the active SR reaches if the active SR determines that at least one of the mandatory services configured on the active SR became unhealthy, the active SR transfers the services from the active SR to a standby SR, transitions from an active state to a standby state, and causes the standby SR to transition from a standby state to an active state. In one embodiment, a check is performed to ensure that the mandatory services are healthy on the standby SR prior to transitioning the standby SR to active.

In step 410, which the active SR reaches if the active SR determines that none of the mandatory services configured on the active SR is unhealthy, the active SR proceeds to performing steps 308-322 of FIG. 3, and thus uses the aggregate scores to determine whether a switchover of the services configured on the active SR should occur.

Figure 5:
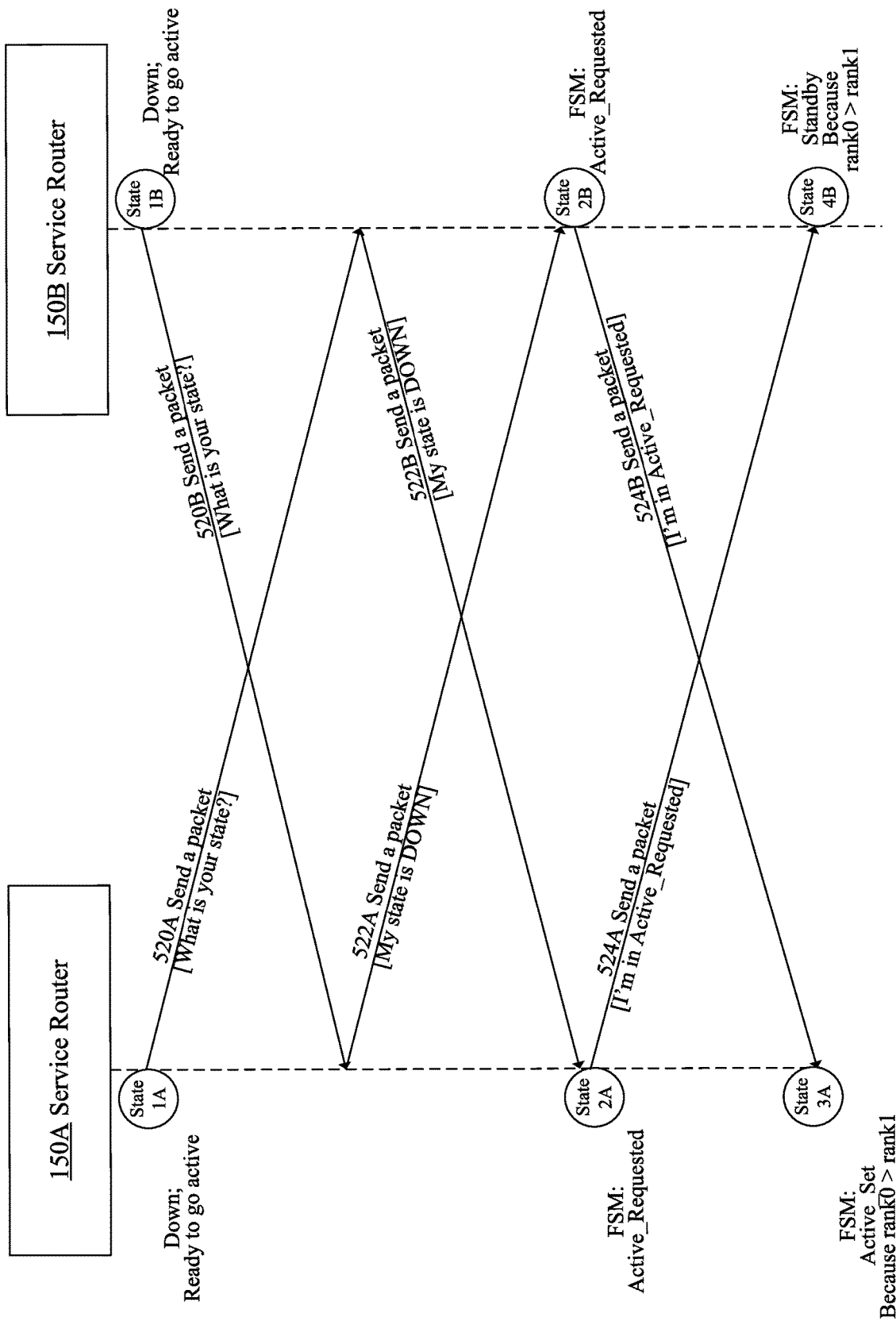
FIG. 5 is a time diagram depicting a tie-breaking process when both service routers are ready to become active at the same time.

6. Example Tie Breaking Process When Two Service Routers are Ready to Become Active FIG. 5 is a time diagram depicting a tie-breaking process when both SRs are ready to become active at the same time. In the depicted example, SR 150A has assigned a rank of zero, while SR 150B has assigned a rank of one. It is assumed that the rank of zero indicates a higher rank, and thus SR 150A has a higher priority than SR 150B.

In FIG. 5, it is assumed that both SRs operate either in a non-preemptive mode or a preemptive mode. If both SRs operate in a non-preemptive mode, then it is assumed that either both SRs are equally healthy, or that SR 150A is healthier than SR 150B. If both SRs operate in a preemptive mode, then it is assumed that either all mandatory services configured on SR 150A are fully operational, or no mandatory service is configured on SR 150A.

The approach described in FIG. 5 illustrates a situation when either both SRs are being rebooted, and thus want to transition from being "down" to being "active." The depicted approach illustrates the messages that the SRs exchange to determine which of the SRs will become active and which will become standby. The messages may be exchanged along a channel that is separate from a BFD channel.

Initially, SR 150A detects that, although SR 150A is "down," SR 150A is ready to become active. Therefore, SR 150A generates, and transmits to SR 150B, a message 520A to inquire about the state of SR 150B.

Meanwhile, SR 150B detects that, although SR 150B is "down," SR 150B is ready to become active. Therefore, SR 150B generates, and transmits to SR 150A, a message 520B to inquire about the state of SR 150A.

Upon receiving the state inquiry, SR 150A generates, and transmits to SR 150B, a message 522A that indicates that SR 150A is "down."

Upon receiving the state inquiry, SR 150B generates, and transmits to SR 150A, a message 522B that indicates that SR 150B is "down."

Upon receiving the message indicating that SR 150B is "down," SR 150A invokes a finite-state machine ("FSM") application to generate an ACTIVE_REQUESTED message 524A. Subsequently, SR 150A transmits to SR 150B an ACTIVE_REQUESTED message 524A to indicate that SR 150A is already in an active state.

Upon receiving the message indicating that SR 150A is "down," SR 150B invokes a FSM application to generate an ACTIVE_REQUESTED message 524B. Subsequently, SR 150B transmits to SR 150A an ACTIVE_REQUESTED message 524B to indicate that SR 150B is requesting an active state.

Upon receiving message 524B indicating that SR 150B requested an active state, SR 150A invokes the FSM application to compare a rank of SR 150A with a rank of SR 150B. Since SR 150A has a higher rank than a rank of SR 150B, the FSM determines that SR 150A should become active. Subsequently, SR 150A transitions to the active state.

Upon receiving message 524A indicating that SR 150A requested an active state, SR 150B invokes the FSM application to compare a rank of SR 150B with a rank of SR 150A. Since SR 150A has a higher rank than a rank of SR 150B, the FSM determines that SR 150B should become standby. Subsequently, SR 150B transitions to the standby state. This concludes the transitioning of SR 150A from a down state to an active state.

7. Example Cooperative Active-Standby Failover Between Two Service Routers

Figure 6:
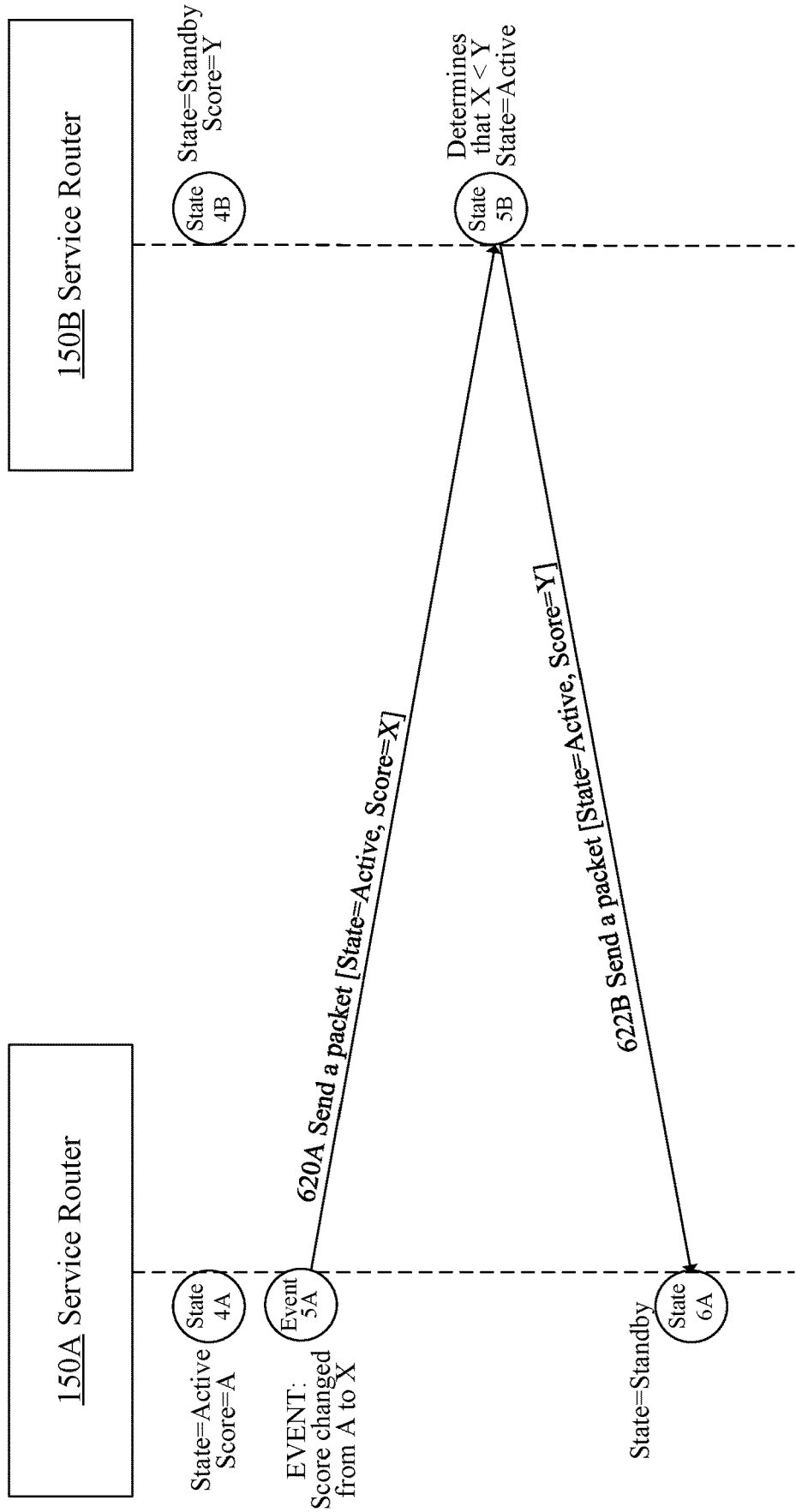
FIG. 6 is a time diagram depicting an example cooperative active-standby failover between two service routers.

FIG. 6 is a time diagram depicting an example cooperative active-standby failover between two service routers. In FIG. 6, it is assumed that both SRs operate either in a non-preemptive mode or a preemptive mode.

It is assumed that SR 150A is in an active state 4A, and a score of SR 150A is a non-negative value "A." It is also assumed that SR 150B is in a standby state 4B, and a score of SR 150B is a non-negative value "Y."

Suppose that an event 5A occurs, and SR 150A determines that its own score has been lowered and changed from "A" to "X," where A is greater than X.

Subsequently, SR 150A sends (620A) a packet to SR 150B. The packet includes information indicating that the state of SR 150A is active, and that the score of SR 150A is X.

Suppose that, upon receiving the packet from SR 150A, SR 150B determines that its own score Y is greater than the score X of SR 150A. If that happen, then SR 150B sends (622B) a packet to SR 150A to indicate that a state 5B of SR 150B as active, and that the score of SR 150B is Y. Upon receiving that packet, SR 150A determines that SR 150B became active. Subsequently, SR 150A transitions to a standby state 6A since SR 150B acts in the active mode now.

However, suppose that, upon receiving the packet from SR 150A, SR 150B determined that its own score Y is lesser than the score X of SR 150A. This situation is not depicted in FIG. 6. In this situation, SR 150B will remain standby. SR 150B will send a packet to SR 150A indicating that the SR 150B is in a standby mode, and that the score of SR 150B is Y. Upon receiving that message, SR 150A will compare its own score of X with the score Y of SR 150B, and determine that its own score of X is greater than the score Y of SR 150B. Therefore, SR 150A will remain active.

In situation when the score X is equal to the score Y, the ranks of SR 150A and SR 150B may be considered, or it may be assumed that for example, SR 150A remains active as long as its own score is not lower than the score of SR 150B.

8. Improvements Provided by Certain Embodiments

In an embodiment, an approach provides mechanisms for implementing a cooperative active-standby failover between logical routers based on health of attached services. The cooperative active-standby failover is triggered upon determining operational states of services configured on the SRs. For example, the cooperative active-standby failover may be triggered based on results of a comparison of aggregate scores computed for the SRs and indicating health status of services configured on the SRs.

In an embodiment, all services configured on an active SR may be switched over to a standby SR when one or more services configured on the active SR fails. Since HA of the services, especially mandatory services, configured on a SR may be paramount to some users, performing a timely switchover of the services from one SR to another SR may be critical to maintain the HA of the logical routers.

9. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

10. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method comprising:
receiving, by a first service router ("SR") of a SR cluster, a plurality of aggregate score values for a plurality of SRs in the SR cluster;
wherein the SR cluster comprises the first SR and a second SR;
wherein the first SR is operating in an active mode;
wherein each of the aggregate score values indicates, for a plurality of services configured on a corresponding one of the SRs, a number of services that are operational;
comparing a first aggregate score value and a first rank for the first SR with a second aggregate score value and a second rank of the second SR, wherein the first aggregate score value of the first SR indicates that one or more services configured on the first SR are operational and at least one service on the first SR is not operational; and
based on the comparing, determining that:
the first SR is as healthy as the second SR; and
the first SR has a higher rank than the second SR; and
based on the first SR being as healthy as the second SR and the first SR having a higher rank than the second SR, causing the first SR to continue to operate in the active mode.

2. The method of claim 1, wherein Ranks are assigned to the SR by users or communicated to the SRs by HA engines.

3. The method of claim 1, further comprising:
in response to determining that the first SR is no longer as healthy as the second SR:
transferring all services from the first SR to the second SR;
causing the first SR to operate in a standby mode; and
causing the second SR to operate in the active mode.

4. The method of claim 1, further comprising:
comparing a revised first aggregate score value for the first SR with a revised second aggregate score value of the second SR to determine whether the second SR, of the SR cluster, is healthier than the first SR, each of the revised first aggregate score and the revised second aggregate score indicating that one or more services on each of the first SR and second SR are operational and the at least one service on the first SR is not operational;
in response to determining that the second SR is healthier than the first SR:
transferring all services from the first SR to the second SR;
causing the first SR to operate in a standby mode; and
causing the second SR to operate in the active mode.

5. The method of claim 1, wherein the aggregate score values are a sum of ready messages received from services configured on a corresponding SR.

6. The method of claim 1, further comprising:
determining, by the first SR, that the first SR operates in a two-tier configuration;
receiving a plurality of associations between scores and tier indicators for services configured on the first SR;
determining, based on the plurality of associations between scores and tier indicators, whether any of critical_tier services configured on the first SR is unhealthy; and
in response to determining that at least one critical_tier service configured on the first SR is unhealthy:
transferring all services from the first SR to the second SR;
causing the first SR to operate in a standby mode; and
causing the second SR to operate in the active mode.

7. The method of claim 1, further comprising:
determining, by the first SR, whether the first SR is ready to become standby;
in response to determining that the first SR is ready to become standby:
transmitting a state query from the first SR to the second SR;
upon receiving a state response from the second SR indicating that the second SR is in a standby-state:
transmitting a standby_requested message from the first SR to the second SR; and
upon receiving an active_requested message from the second SR:
setting a standby state on the first SR.

8. One or more non-transitory computer-readable storage media storing one or more computer instructions which, when executed by one or more processors, cause the one or more processors to perform:
receiving, by a first service router ("SR") of a SR cluster, a plurality of aggregate score values for a plurality of SRs in the SR cluster;
wherein the SR cluster comprises the first SR and a second SR;
wherein the second SR is operating in an active mode;
wherein each of the aggregate score values indicates, for a plurality of services configured on a corresponding one of the SRs, a number of services that are operational;
comparing a first aggregate score value and a first rank for the first SR with a second aggregate score value and a second rank of the second SR, wherein the first aggregate score value of the first SR indicates that one or more services configured on the first SR are operational and at least one service on the first SR is not operational; and
based on the comparing, determining that the first SR is as healthy as the second SR and that the first rank of the first SR is higher than the second rank of the second SR, causing the first SR to operate in the active mode and the second SR to operate in standby mode.

9. The one or more non-transitory computer-readable storage media of claim 8, comprising additional instructions which, when executed by the one or more processors, cause the one or more processors to perform:
determining, based on a revised plurality of aggregate score values, whether the first SR, of the SR cluster, is as healthy as the second SR;
in response to determining that the first SR is not as healthy as the second SR:
causing the second SR to operate in the active mode.

10. The one or more non-transitory computer-readable storage media of claim 9, comprising additional instructions which, when executed by the one or more processors, cause the one or more processors to perform:
in response to determining that the first SR, of the SR cluster, is as healthy as the second SR and in response to determining that the first rank of the first SR is greater than the second rank of the second SR:
transferring all services from the second SR to the first SR;
causing the first SR to operate in the active mode; and
causing the second SR to operate in the standby mode.

11. The one or more non-transitory computer-readable storage media of claim 8, comprising additional instructions which, when executed by the one or more processors, cause the one or more processors to perform:
- determining, based on the plurality of revised aggregate score values, whether the second SR, of the SR cluster, is healthier than the first SR;
- in response to determining that the second SR is healthier than the first SR:
  - transferring all services from the first SR to the second SR;
  - causing the first SR to operate in a standby mode; and
  - causing the second SR to operate in the active mode.

12. The one or more non-transitory computer-readable storage media of claim 8, wherein the active mode is not a rank.

13. The one or more non-transitory computer-readable storage media of claim 8, comprising additional instructions which, when executed by the one or more processors, cause the one or more processors to perform:
- determining, by the first SR, that the first SR operates in a two-tier configuration;
- receiving a plurality of associations between scores and tier indicators for services configured on the first SR;
- determining, based on the plurality of associations between scores and tier indicators, whether any of critical_tier services configured on the first SR is unhealthy; and
- in response to determining that at least one critical_tier service configured on the first SR is unhealthy:
  - transferring all services from the first SR to the second SR;
  - causing the first SR to operate in a standby mode; and
  - causing the second SR to operate in the active mode.

14. The one or more non-transitory computer-readable storage media of claim 8, comprising additional instructions which, when executed by the one or more processors, cause the one or more processors to perform:
- determining, by the first SR, whether the first SR is ready to become standby;
- in response to determining that the first SR is ready to become standby:
  - transmitting a state query from the first SR to the second SR;
  - upon receiving a state response from the second SR indicating that the second SR is in a standby-state:
    - transmitting a standby_requested message from the first SR to the second SR; and
    - upon receiving an active_requested message from the second SR:
      - setting a standby state on the first SR.

15. A system comprising:
- one or more processors;
- one or more memory units; and
- one or more non-transitory computer-readable storage media storing one or more computer instructions which, when executed by the one or more processors, cause the one or more processors to perform:
- receiving, by a first service router ("SR") of a SR cluster, a plurality of aggregate score values for a plurality of SRs in the SR cluster;
- wherein the SR cluster comprises the first SR and a second SR;
- wherein the first SR is operating in an active mode;
- wherein each of the aggregate score values indicates, for a plurality of services configured on a corresponding one of the SRs, a number of services that are operational;
- comparing a first aggregate score value and a first rank of the first SR with a second aggregate score value and a second rank of the second SR, wherein the first aggregate score value of the first SR indicates that one or more services configured on the first SR are operational and at least one service on the first SR is not operational; and
- based on the comparing, determining that the first SR is as healthy as the second SR and that the first rank of the first SR is higher than the second rank of the second SR, causing the first SR to continue to operate in the active mode.

16. The system of claim 15, storing additional instructions which, when executed by the one or more processes, cause the one or more processors to perform:
- determining, based on a revised plurality of aggregate score values, whether the first SR, of the SR cluster, is as healthy as the second SR;
- in response to determining that the first SR is not as healthy as the second SR:
  - causing the second SR to operate in the active mode.

17. The system of claim 16, storing additional instructions which, when executed by the one or more processes, cause the one or more processors to perform:
- in response to determining that the first SR, of the SR cluster, is as healthy as the second SR and that the first rank of the first SR is greater than the second rank of the second SR;
  - transferring all services from the first SR to the second SR;
  - causing the first SR to operate in a standby mode; and
  - causing the second SR to operate in the active mode.

18. The system of claim 15, storing additional instructions which, when executed by the one or more processes, cause the one or more processors to perform:
- determining, based on a revised plurality of aggregate score values, whether the second SR, of the SR cluster, is healthier than the first SR;
- in response to determining that the second SR is healthier than the first SR:
  - transferring all services from the first SR to the second SR;
  - causing the first SR to operate in a standby mode; and
  - causing the second SR to operate in the active mode.

19. The system of claim 15, storing additional instructions which, when executed by the one or more processes, cause the one or more processors to perform:
- determining whether a revised first aggregate score obtained for the first SR is greater than revised second aggregate score obtained for the second SR; and
- in response to determining that the revised first aggregate score obtained for the first SR is greater than the revised second aggregate score obtained for the second SR, determining that the first SR is healthier than the second SR.

20. The system of claim 15, storing additional instructions which, when executed by the one or more processes, cause the one or more processors to perform:
- determining, by the first SR, whether the first SR is ready to become standby;

in response to determining that the first SR is ready to become standby:
   transmitting a state query from the first SR to the second SR;
   upon receiving a state response from the second SR indicating that the second SR is in a standby-state:
      transmitting a standby_requested message from the first SR to the second SR; and
      upon receiving an active_requested message from the second SR:
         setting a standby state on the first SR.

\* \* \* \* \*